(12) United States Patent
Webster et al.

(10) Patent No.: US 6,233,273 B1
(45) Date of Patent: May 15, 2001

(54) RAKE RECEIVER WITH EMBEDDED DECISION FEEDBACK EQUALIZER

(75) Inventors: Mark A. Webster, Palm Bay; George R. Nelson, Merritt Island; Karen W. Halford, Palm Bay; Carl F. Andren, Indialantic, all of FL (US)

(73) Assignee: Intersil Americas Inc., Irvine, CA (US)

( * ) Notice: Subject to any disclaimer, the term of this patent is extended or adjusted under 35 U.S.C. 154(b) by 0 days.

(21) Appl. No.: 09/342,583

(22) Filed: Jun. 29, 1999

(51) Int. Cl.[7] .............................. H04B 15/00; H04K 1/00; H04L 27/30
(52) U.S. Cl. .......................... 375/148; 375/150; 375/152; 370/342
(58) Field of Search ...................................... 375/140, 142, 375/143, 144, 148, 150, 152; 370/320, 335, 342, 441

(56) References Cited

U.S. PATENT DOCUMENTS

| | | | |
|---|---|---|---|
| 5,353,306 | * 10/1994 | Yamamoto | 375/233 |
| 6,011,812 | * 1/2000 | Laakso et al. | 375/208 |
| 6,012,161 | * 1/2000 | Ariyavisitakul et al. | 714/795 |

* cited by examiner

Primary Examiner—Chi Pham
Assistant Examiner—Phuong Phu
(74) Attorney, Agent, or Firm—Gary R. Stanford

(57) ABSTRACT

The performance of a RAKE receiver for indoor multipath WLAN applications on direct sequence spread spectrum signals having relatively short codeword lengths is enhanced by embedding a decision feedback equalizer structure in the signal processing path through the receiver's channel matched filter and codeword correlator. The decision feedback equalizer serves to cancel both inter-codeword interference (ISI) or 'bleed-over' between codewords, and intra-codeword chip interference (ICI) or smearing of the energy within the chips of a respective codeword.

3 Claims, 5 Drawing Sheets

RAKE RECEIVER WITH EMBEDDED DECISION FEEDBACK EQUALIZER

FIELD OF THE INVENTION

The present invention relates in general to wireless communication systems, such as but not limited to wireless local area networks (WLANs), and is particularly directed to a new and improved RAKE receiver that contains an embedded decision feedback equalizer (DFE) that increases the receiver's tolerance to the effects of (indoor WLAN) multipath distortion without losing robustness to thermal noise.

BACKGROUND OF THE INVENTION

The ongoing demand for faster (higher data rate) wireless communication products is currently the subject of a number of proposals before the IEEE 802.11 committee, that involve the use of a new standard for the 2.4 GHZ portion of the spectrum, which FCC Part 15.247 requires be implemented using spread spectrum techniques that enable intra-packet data rates to exceed 10 Mbps Ethernet speeds. The 802.11 standard presently covers only one and two Mpbs data rates, that use either frequency hopping (FH) or direct sequence (DS) spread spectrum (SS) techniques. The FCC requirement for the use of spread spectrum signaling takes advantage of inherent SS properties that make the signals more robust to inadvertence interference—by lowering the average transmit power spectral density, and through receiver techniques which exploit spectral redundancy and thereby combat self-interference created by multipath distortion.

As shown in FIG. 1, the power delay profile (PDF) 10 of a transmitted signal due to multipath distortion within an indoor WLAN system, such as the reduced complexity example illustrated in FIG. 2, exhibits a largely exponentially-decayed Rayleigh fading characteristic. Physical aspects of the indoor transmission environment driving this behavior are the relatively large number of reflectors (e.g., walls) within the building, such as shown at nodes 12 and 13, between a transmitter site 14 and a receiver site 15, and the propagation loss associated with the respectively later time-of-arrival propagation paths $t_1$, $t_2$ and $t_3$, which contain logarithmically weaker energies.

The power delay profile of the signal is the variation in mean signal power with respect to its power dispersed across time. The mean power level of the signal establishes the variance of its corresponding Rayleigh components. A principal aspect of the exponentially decayed multipath effect is due to the fact that a signal's propagation delay $t_i$ is proportional to the total distance traveled, so that, on-average, the strongest (minimal obstruction containing) transmission paths are those whose signals are the earliest to arrive at the receiver. In a given stochastic occurrence, a first to arrive, direct or line-of-sight path from the transmitter site 14 to the receiver site 15 may encounter an attenuating medium (such as one or more building walls and the like), while a later arriving signal reflected off a highly reflective surface and encounter no attenuating media may be have a larger channel impulse response (CIR) than the first-to-arrive signal. However, on average, such occurrences are few in number relative to the number of echo signals which follow the CIR peak.

In terms of a practical application, the root mean squared (RMS) delay spread of a multipath channel may range from 20–50 nsec for small office and home office (SOHO) environments, 50–100 nsec for commercial environments, and 100–200 nsec for factory environments. For exponentially faded channels, the (exponential) decay constant is equal to the RMS delay spread. For relatively low signal bandwidths (less than 1 MHz), fading due to multipath is mostly 'flat'. However, at bandwidths above 1 MHz, for example at the 10 MHz bandwidth required by a direct sequence spread spectrum (DSSS) system to attain the above-referenced higher data rate of 10 Mbps, fading becomes selective with frequency, constituting a serious impediment to reliable communications over a multipath channel. Thus, multipath distortion within a WLAN environment can cause severe propagation loss over the ISM band.

A preferred mechanism to counter this severe frequency-selective multipath distortion problem is a channel-matched correlation receiver, commonly referred to as a 'RAKE' receiver. For successful RAKE receiver operation, it is necessary to use a DSSS structure having a transmitted bandwidth larger than the information bandwidth. In a DSSS signal structure, a respective codeword is formed of a sequence of PN code 'chips'. The term 'codeword', rather than 'symbol', is employed here to avoid confusion between 'chips' and codewords. The DSSS chips may be transmitted using a relatively simple modulation scheme such as QPSK, and codeword chips may be fixed as in a signature sequence, or they may be pseudo random.

In addition, phase modulation of the codeword may be used to convey information. Namely, to impart additional bits of information per codeword, the codeword may be shifted in phase. For example two additional bits may be used to provide quadrature (ninety degree) phase shift increments: 0°, 90°, 180° and 270°. The codeword's chips may be selected from a multi-codeword set, where M bits select a particular codeword out of N codewords that make up the multi-codeword set. An example of such a scheme is the use of Walsh or Hadamard codes for the codeword set.

For the above-referenced 2.4 GHz spectrum, the IEEE 802.11 standards committee has proposed using an eight bit encoding scheme, in which six bits select one of N=64 multi-chip codewords, and the remaining two bits define one of four possible (quadrature) phases of the selected codeword.

As diagrammatically illustrated in FIG. 3, in a channel-matched correlation or RAKE receiver, the received (spread) signal is coupled to a codeword correlator 31, the output of which (shown as a sequence of time-of-arrival impulses 32-1, 32-2, 32-3) is applied to a coherent multipath combiner 33. The codeword correlator 31 contains a plurality of correlators each of which is configured to detect a respectively different one of the codewords of the multi-codeword set. The coherent multipath combiner may be readily implemented as a channel matched filter (whose filter taps have been established by means of a training preamble prior to commencement of a data transmission session). The output of the coherent multipath combiner 33 is coupled to a peak or largest value detector 35, which selects the largest output produced by the coherent multipath combiner as the transmitted codeword. Since the RAKE receiver is a linear system, the order of the operations carried out by the channel matched filter (coherent multipath combiner) 33 and codeword correlator 31 may be reversed, as shown in FIG. 4, wherein the channel matched filter 33 is installed upstream of the codeword correlator 31.

A RAKE receiver works reasonably well, since it coherently combines the multipath received signals plus echoes into a single composite signal. By proper choice of the codewords that make up the codeword set, the echoes can be effectively eliminated during codeword correlation. Ideally, each codeword of the set has the following properties: 1—an impulse auto-correlation function; 2—it is mutually orthogonal (has a zero cross-correlation function) to all other codewords of the set; 3—it is long relative to the multipath spread; and 4—it has the same energy of each of the other N codewords of the set.

If properties 2 and 4 are absent, the RAKE receiver must establish an orthogonal basis and account for the imbalance, just as in quadrature amplitude modulation—a receiver complexity issue. Also, the codewords need not be long relative to the multipath spread, so long as the codewords are impulsive and have zero cross-correlation functions (namely, no intercodeword or intersymbol interference (ISI)). Interchip interference impacts only receiver energy (if the impulsive auto-correlation property is absent). Although an optimal RAKE receiver imparts orthogonality to the codeword correlator output and make a decision by observing all correlator outputs, no RAKE receiver is ideal, since it is effectively impossible to generate codewords having impulsive auto-correlation functions and zero cross-correlation functions.

In addition, for severe multipath, in order to minimize degradation due to intercodeword interference, the codeword length must be very large (e.g., on the order of 64, 128, 256 or above, as used in military applications). However, in commercial environments, the number of chips per codeword must be limited in order to maximize useable data bandwidth. Since the extent of codeword bleedover increases as the number of chips per codeword is reduced, where multipath distortion is significant, a very small codeword chip density may cause codeword energy bleedover/leakage across multiple codewords. The problem therefore is how to optimize the signal-to-noise ratio of the output of the RAKE receiver using such less than ideal codewords.

SUMMARY OF THE INVENTION

In accordance with the present invention, this problem is successfully addressed by an enhanced RAKE receiver architecture that contains a chip-based decision feedback equalizer (DFE) structure embedded in the signal processing path through the receiver's channel matched filter and codeword correlator. This decision feedback equalizer serves to reduce or cancel two types of distortion to which the limited chip length codewords are subjected as they are convolved with the multipath channel during transmission. The first is the 'bleeding' or leakage of energy in a respective codeword $CW_i$ with that of another codeword $CW_{i+j}$. The second form of distortion is a 'smearing' of the energy within the chips of a respective codeword.

A decision feedback equalizer is especially suited for combating indoor multipath distortion in a WLAN, since this type of multipath distortion is predominantly minimum phase, as the strongest signal components almost always arrive first, while the weaker components arrive last. Therefore, most of the multipath distortion appears as a decaying 'tail' on the channel impulse response. Moreover, the feedback taps of a DFE serve ideally to combat minimum phase multipath distortion, while the feed-forward taps combat maximum phase components. As a result, a DFE for combating indoor multipath requires very few feed-forward taps, with most of the processing being executed in the feedback taps. Since implementing DFE feed-forward taps at baseband requires full complex multipliers, while feedback taps need only complex addition and subtraction when QPSK elements are employed, so that implementation complexity is not a significant issue.

Although embedding a DFE into a RAKE receiver readily combats indoor multipath, it makes decisions on a chip, and therefore requires relatively high SNRs. The feedback taps eliminate the long decaying multipath echo tail and can span multiple codewords, so as to cancel inter-chip smearing and inter-codeword bleedover. The codeword correlator improves the signal-to-noise ratio by coherently combining the codeword's soft decision chips. Should a DFE chip-decision error be made, the codeword correlator is still able to make a correct decision by coherently combining all of the codeword's chips.

For lower signal-to-noise ratios, error propagation in the decision feedback equalizer causes chip errors to occur in bursts. If soft chip decisions for setting the tap coefficients of the equalizer are incorrect, the DFE tap-weighting characteristic will rapidly degrade, preventing multipath distortion compensation. To handle low SNR, all of the received codeword chips are examined prior to making a hard decision. This is accomplished by generating a DFE-based correlation detection statistic for each codeword that could have been sent. The detection statistic for a potentially transmitted codeword is generated by performing feedback equalization of the codeword's chips, with the presumption that the codeword was actually transmitted.

A DFE-embedded signal processing architecture for canceling inter-codeword interference may be 'wrapped around' the codeword correlator. In such an architecture, the channel matched filter is differentially combined with a post-cursor representative echo that is produced by estimating the channel impulse response. The result is a 'cleaned-up' copy of the received codeword, which is coupled to the RAKE receiver's codeword correlator. The correlator output is coupled to codeword decision operator which examines all of the chips in a received codeword, to make a decision as to what codeword was actually transmitted. The codeword decision is used to synthesize a replica of the chip contents and phase information of the transmitted codeword. This synthesized codeword is then convolved with an estimate of the channel impulse response implemented in an FIR filter, to produce the representation of the post-cursor multipath echo in the signal received by the channel matched filter.

To cancel intra-codeword chip-smearing of the energy within the chips of a respective codeword, the signal processing branch through each respective codeword correlator is configured to differentially combine the contents of all of the chips that make up each received codeword with a respective one of different sets of codeword-associated DFE feedback taps, that represent the post cursor multipath distortion echoes experienced by that particular codeword in the course of its transmission over the multipath channel from the transmitter. The post cursor multipath distortion may be removed either upstream or downstream of the codeword correlator.

In the upstream implementation, each successively received codeword chip set is coupled to a plurality of codeword correlator statistical branches, each of which is associated with a different codeword. For the non-limiting example of using an eight bit field, there are K=256 codeword combinations (comprised of $2^6$=64 codewords, each QPSK encoded at one of $2^2$=4 possible quadrature phases (0°, 90°, 180°, 270°)). In a respective codeword correlator branch, the received signal path is differentially combined with the output of an FIR filter feedback tap set, that synthesizes the multipath channel impulse response for its respective codeword's chip set (e.g., comprised of eight chips per codeword in the present example), so as to produce a representation of the post-cursor multipath echo for that codeword chip set. By subtracting the synthesized post-cursor multipath echo from the received codeword, the input to an associated branch codeword correlator is effectively a 'cleaned-up' version of the received codeword chip set from which multipath-based chip smearing has been removed. The output of each codeword correlator is coupled to a peak detector which selects the largest output as the transmitted codeword.

A more computationally efficient scheme for synthesizing the multipath channel impulse response may be realized by subtracting the respective FIR feedback filter tap stages from the received signal downstream of each codeword correlator. For reduced complexity the codeword correlator may be implemented as a fast Walsh (Hadamard) structure. Because the differential combining of the processing path for the received signal and the feedback taps is a post-correlation operation, there is no need to regenerate the feedback taps as each newly received codeword chip set is clocked into the correlator. This reduces implementation complexity by allowing the functionality of the synthesized tap path to be stored in a look-up table.

DETAILED DESCRIPTION

Figure 1:
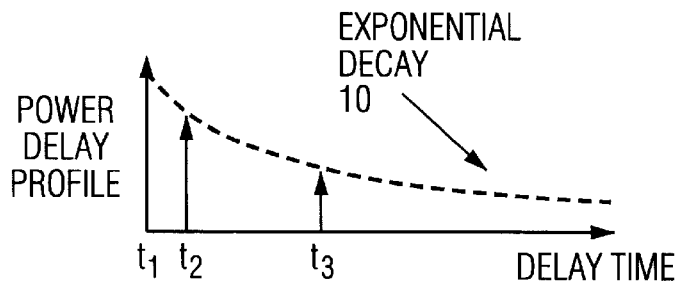
FIG. 1 shows the power delay profile associated with multipath distortion of an indoor WLAN system.
Figure 2:
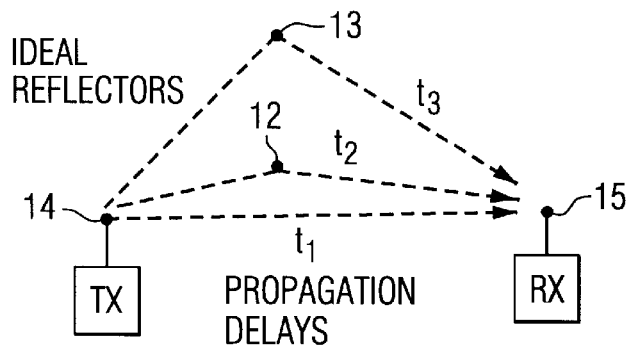
FIG. 2 diagrammatically illustrates a reduced complexity example of an indoor WLAN system having a plurality of reflectors between a transmitter site and a receiver site.
Figure 3:
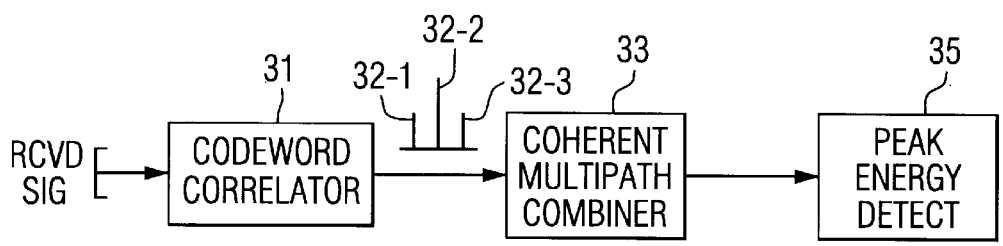
FIG. 3 diagrammatically illustrates a conventional RAKE receiver.
Figure 4:
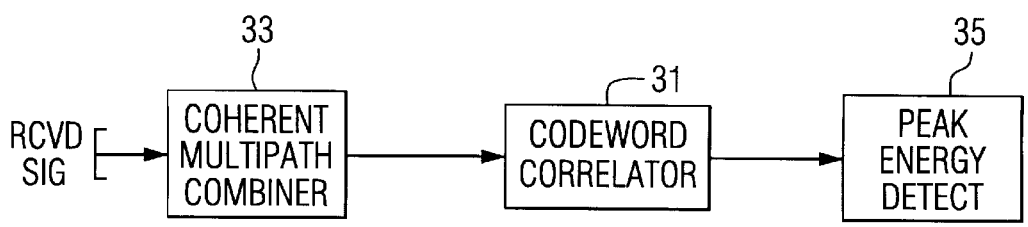
FIG. 4 shows the RAKE receiver of FIG. 3, in which the order of the operations carried out by the channel matched filter (coherent multipath combiner) and codeword correlator are reversed.

Before describing in detail the new and improved embedded DFE RAKE receiver architecture of the invention, it should be observed that the receiver architecture of the invention resides primarily in modular arrangements of conventional digital communication circuits and associated digital signal processing components, and attendant supervisory control circuitry therefor that controls the operations of such circuits and components. It is also to be understood that the invention may be applied to any codeword-modulated direct sequence spread spectrum (DSSS) signal, including complementary codes. In a practical implementation that facilitates its incorporation into existing printed circuit cards of wireless telecommunication equipment, the invention may be readily implemented as field programmable gate array (FPGA)-implemented, or application specific integrated circuit (ASIC) chip sets.

Consequently, the configuration of such arrangements of circuits and components and the manner in which they are interfaced with other telecommunication equipment have, for the most part, been illustrated in the drawings by readily understandable block diagrams, which show only those details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

In order to appreciate the improvement provided by the DFE-enhanced RAKE receiver of the invention, it is initially useful to examine the distortion effects of limited chip-length direct sequence spread spectrum codewords that are countered by the present invention.

Figure 5:
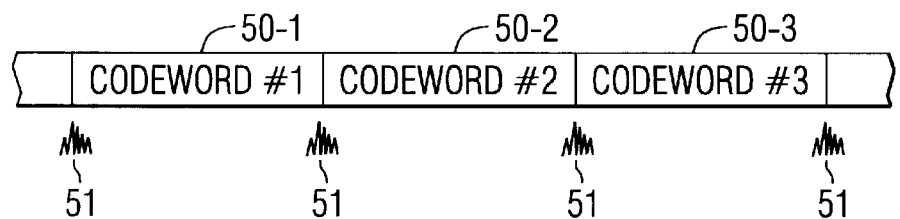
FIG. 5 shows a portion of a sequence of limited chip-length codewords transmitted over a multipath WLAN channel.

FIG. 5 shows a portion of a sequence of limited chip-length direct sequence spread spectrum codewords (CWs) . . . , 50-1, 50-2, 50-3, . . . , being transmitted over a multipath WLAN channel. During transmission the chips convolve with the channel to create two types of distortion: inter-codeword bleed-over and intra-codeword chip-smearing. The former effect, shown at 51 is the 'bleeding' over energy in a respective codeword $CW_i$ with that of another codeword $CW_{i+j}$. The second form of distortion is a 'smearing' of the energy within the chips of a respective codeword.

Figure 6:
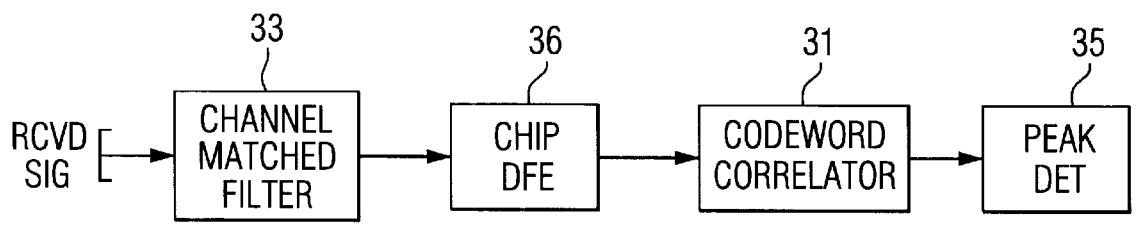
FIG. 6 diagrammatically illustrates a RAKE receiver having a decision feedback equalizer embedded in the signal processing path through the coherent multipath combiner filter and the codeword correlator.
Figure 7:
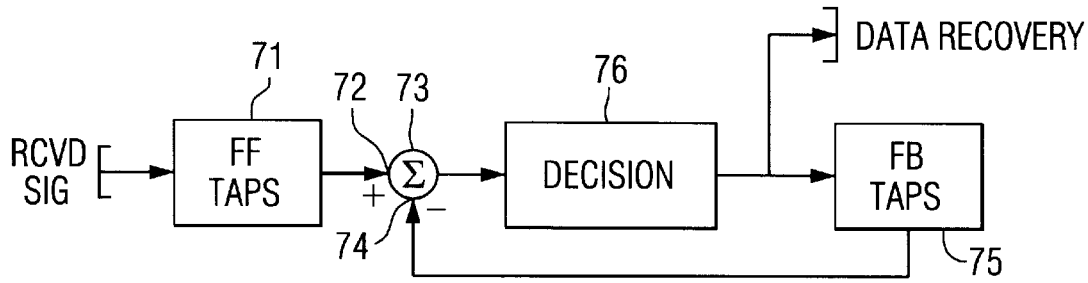
FIG. 7 diagrammatically illustrates a decision feedback equalizer.
Figure 8:
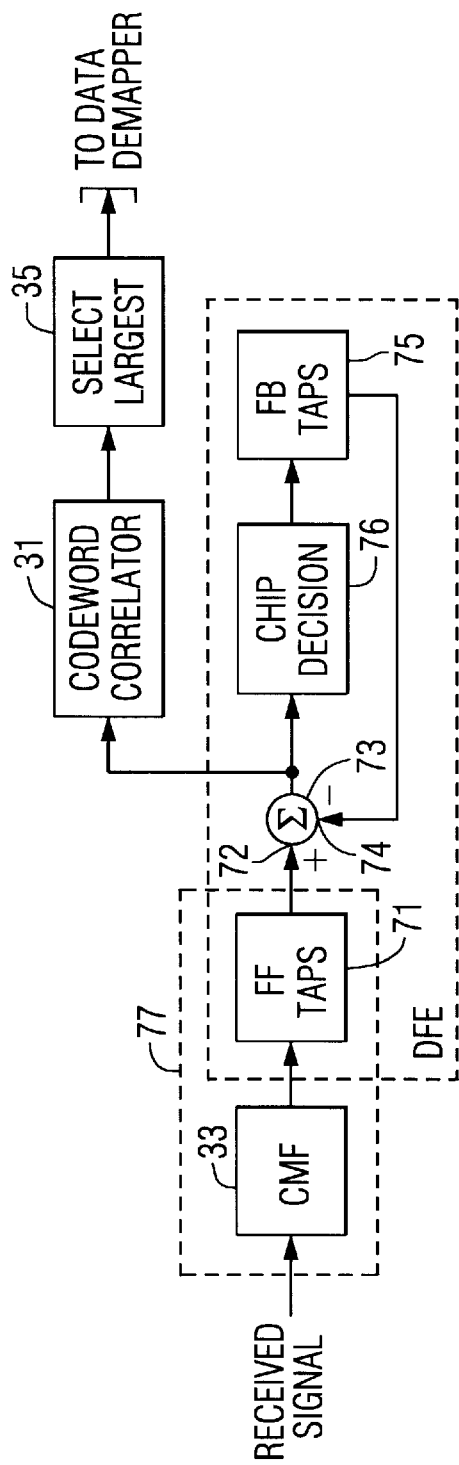
FIG. 8 illustrates the RAKE receiver of FIG. 6 containing the decision feedback equalizer structure of FIG. 7.

A solution to this problem, illustrated in FIG. 6, is to modify the RAKE receiver by installing a chip-based decision feedback equalizer (DFE) 36, in the signal processing path between the coherent multipath combiner (channel matched filter) 33 and the codeword correlator 31. The basic configuration of a decision feedback equalizer is shown in FIG. 7 as comprising a multi-tap delay line configured finite impulse response (FIR) filter structure, containing a plurality of feed-forward taps 71, the signal transport path through which is coupled to a first input 72 of a differential combiner 73, having a second input 74 coupled to receive the output of a set of feedback taps 75. The output of the differential combiner 73 is coupled to a decision unit 76, the output of which is coupled to the feedback taps 75. FIG. 8 illustrates the RAKE receiver of FIG. 6, incorporating the decision feedback equalizer structure of FIG. 7. This signal processing architecture is operative to DFE-equalize the chips before soft, equalized chip levels are supplied to the codeword correlator 31. For efficient signal processing the channel matched filter 33 and the feed-forward tap section 71 of the front end of the DFE may be implemented in a composite structure as a 'whitened' matched filter, shown by broken lines 77.

The are two principal reasons that a decision feedback equalizer is especially suited for combating indoor multipath. First, the multipath distortion is predominantly minimum phase, since the strongest signal components arrive first, while the weaker components arrive last. As described previously, with reference to the exponential power decay characteristic of FIG. 1, later arriving (multipath) components tend to be relatively weak, so that most of the multipath distortion appears as a decaying 'tail' on the channel impulse response.

Secondly, the feedback taps of a DFE serve ideally to combat minimum phase multipath components, while the feed-forward taps combat maximum phase components. As a consequence, a DFE for combating indoor multipath requires only a few feed-forward taps, with most of the processing being executed in the feedback taps. Because implementing the feed-forward taps of the DFE at baseband entails the use of full complex multipliers, while the feedback taps require only complex addition and substraction when QPSK elements are employed, for practical applications, it is preferred to employ an implementation that is dominated by feedback taps.

Figure 9:
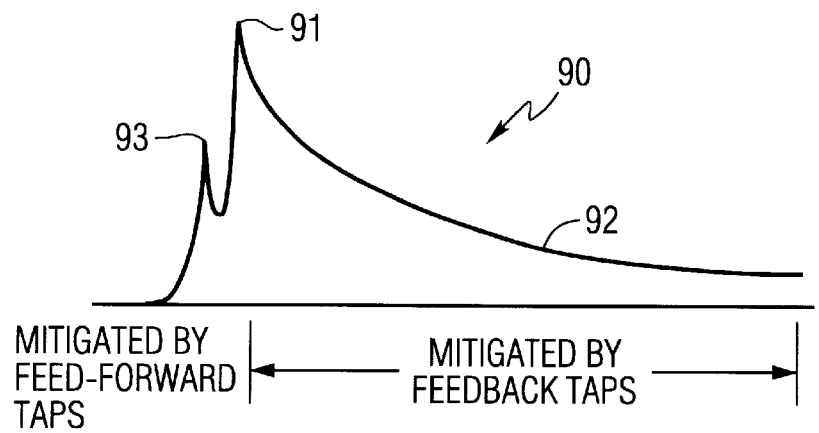
FIG. 9 shows a multipath impulse response characteristic.

FIG. 9 shows a multipath impulse response characteristic 90 for the largest impulse response component. Usually, the decision unit of a DFE is centered on the peak 91 of the impulse response, since it is a single component with the largest signal-to-noise ratio. The feedback taps subtract the 'tail' 92 following the peak 91, while the feed-forward taps cancel the front-end impulse components 93 that precede the peak. In other words, in a conventional DFE, canceling (intersymbol) interference involves forcing the energy outside the peak of the impulse to zero. Where only feedback taps are used, there is no noise amplification during equalization, and no complex multiplies are required, as noted above. As can be seen from FIG. 1, this is nearly the case for an indoor wireless channel.

Now although the incorporation of a decision feedback equalizer into a RAKE receiver is an especially useful mechanism for combatting indoor multipath, it makes decisions on a chip, so that it requires relatively high SNRs (e.g., at or greater than 10 dB) for successful operation. The DFE feedback taps 75 eliminate the long decaying multipath tail 92 and can span multiple codewords, thereby canceling for inter-chip smearing and inter-codeword bleedover, referenced above. The codeword correlator 31 provides an SNR enhancement by coherently combining the codeword's soft decision chips. Even if a DFE chip-decision error is made, the codeword correlator is still able to make a correct decision by coherently combining all of the codeword's chips.

However, for lower signal-to-noise ratios, error propagation in the decision feedback equalizer causes chip errors to occur in bursts. If soft chip decisions for setting the tap coefficients of the equalizer are incorrect, the entire DFE tap-weighting characteristic will soon be wrong, preventing multipath distortion compensation. Namely, as noise levels increase, the codeword decisions usually break down, shortly after the chip decisions break down.

In order to remedy this low SNR problem, all of the received codeword chips are examined prior to making a hard decision. This is accomplished by generating a DFE-based detection statistic for each codeword (rather than for each chip) that could have been sent. The detection statistic for a given potentially transmitted ('trial') codeword is generated by performing feedback equalization of the codeword's chips, on the preliminary assumption that the codeword of interest was actually transmitted.

As pointed out above, during transmission, codewords convolve with the channel to create two types of distortion: inter-codeword interference or 'bleed-over' (namely, intersymbol interference (ISI)) between codewords, and intra-codeword chip interference (ICI) or smearing of the energy within the chips of a respective codeword $CW_i$. The degree of ISI is related to the number of chips per codeword and the extent of multipath distortion. For DSSS mechanisms, such as those employed in military applications, where the number of chips per codeword is typically large (e.g., on the order of 64, 128, 256 or more), codeword bleedover is relatively insignificant.

However, as pointed out above, in commercial environments, the number of chips per codeword is considerably constrained (e.g., to only eight per codeword), in order to maximize data bandwidth availability. Since the extent of codeword bleedover increases as the number of chips per codeword is reduced, where multipath is significant, a very small codeword chip density can not only result in bleedover across immediately successive codeword boundaries, but across multiple codewords.

Figure 10:
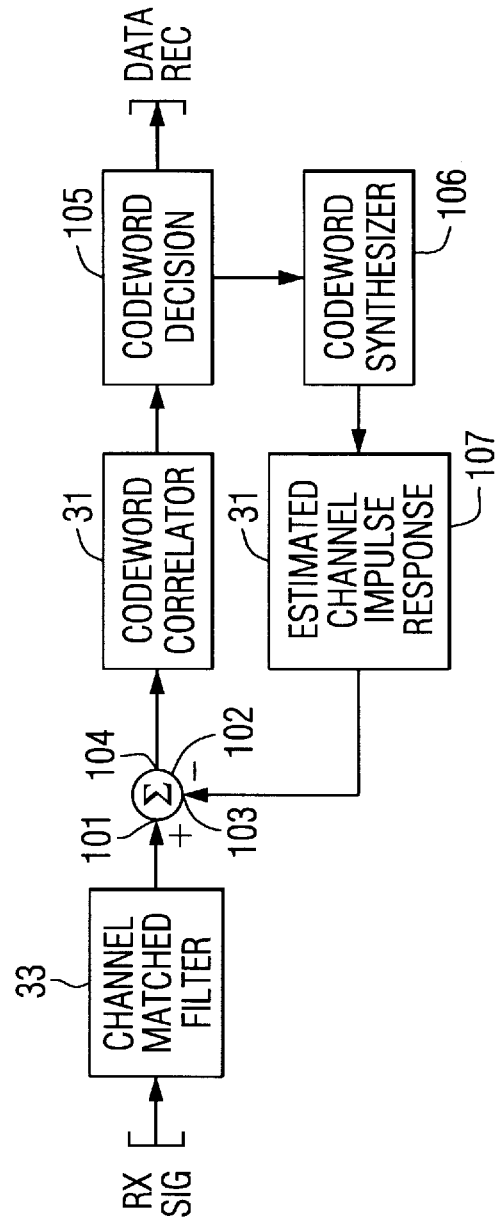
FIG. 10 diagrammatically illustrates a DFE-embedded signal processing architecture for canceling multipath-based inter-codeword interference (ISI)

A DFE-embedded signal processing architecture for canceling such inter-codeword interference (ISI) is diagrammatically illustrated in FIG. 10 as being 'wrapped around' the codeword correlator. For this purpose, the output of the channel matched filter 33 is coupled to a first input 101 of a differential combiner 102, which has a second input 103 coupled to receive a post-cursor representative echo that is produced by estimating the channel impulse response. The output 104 of the differential combiner 102, which represents a 'cleaned-up' copy of the received codeword, is coupled to codeword correlator 31, the output of which is supplied to a codeword decision operator 105. The codeword decision operator 105 examines all of the M chips in a received codeword, rather than an individual chip, to make a decision as to what codeword was actually transmitted.

Given this codeword decision derived by operator 105, a replica of the chip contents and phase information of the decided upon originally transmitted codeword is then synthesized in a transmitted codeword synthesizer 106. This synthesized codeword is then convolved with an estimate of the channel impulse response implemented in an FIR filter 107, so as to produce a representation of the post-cursor multipath echo in the signal received by the channel matched filter 33. By applying this post-cursor echo to the differential combiner 102, the total ISI contribution in the output of the channel matched filter 33 is effectively canceled from the input to the codeword processor 31. It should be noted that the estimate of the channel impulse response implemented in the FIR filter 107 is not (codeword) length restricted; its output covers the entirety of the post-cursor multipath echo in the signal received by the channel matched filter 33, whether it crosses one or a plurality of codeword boundaries. Also, for efficient signal processing the channel matched filter and the feed-forward tap section of the DFE may be implemented as a 'whitened' matched filter, as described previously.

Figure 11:
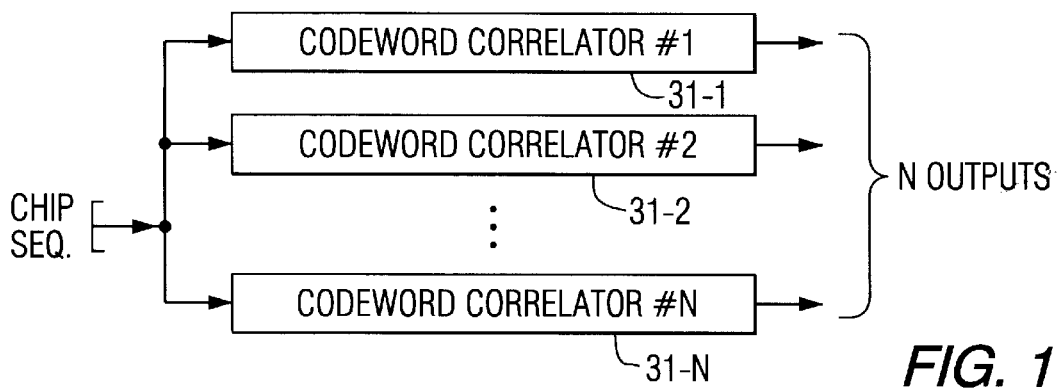
FIG. 11 diagrammatically illustrates a conventional codeword correlator for a RAKE receiver.

A DFE-embedded signal processing architecture for canceling intra-codeword chip-smearing of the energy within the chips of a respective codeword $CW_i$ will now be described with reference to FIGS. 11–13. As shown in FIG. 11, a conventional codeword correlator 31 for a RAKE receiver has a plurality of individual codeword correlators 31-1–31-N, each of which detects a respectively different codeword chip set. The present example of an eight bitfield defines 256 codeword combinations (comprised of $2^6$=64 codewords, each at one of $2^2$=4 possible quadrature phases (0°, 90°, 180°, 270°)). As each codeword of the present example is comprised of eight chips, there are a total of $4^8$=64K possible chip combinations from which the 64 codeword chip combinations may be selected.

Using a set of a priori requirements that are based upon attributes of the communication application (indoor WLAN), and to facilitate a reduced complexity implementation of the correlator, the initial large number of possible chip combinations may be empirically reduced to only those codewords having a prescribed chip set structure, such as a Walsh or Hadamard structure, as described previously. Even though such selection criteria may be satisfied, from a practical standpoint, not all of the codewords of the chosen set will have ideal properties (especially the preferred autocorrelation and crosscorrelation properties described above), so that even without multipath based chip smearing, the correlator outputs will not exhibit ideal impulse/zero characteristics. Due to multipath distortion of these less than ideal chip sets, and the resulting very low signal-to-noise ratio of each chip, it can therefore be expected that, without some form of chip distortion compensation, the outputs of more than one codeword correlator will be substantially indistinguishable.

To counter this chip-smearing problem, and improve the detection statistic of the codeword correlator, the signal processing branch through each respective codeword correlator of the invention is configured to differentially combine the contents of all of the chips that make up each received codeword with a respective one of different sets of codeword-associated DFE feedback taps, that represent the post cursor multipath distortion echoes experienced by that particular codeword in the course of its transmission over the multipath channel from the transmitter. Processing the chips of each received codeword together serves to increase the SNR of the received signal by 6 dB and enables improve the detection statistic accuracy of each codeword correlator branch. Respective embodiments for effecting subtraction or removal of the post cursor multipath distortion from the correlator output upstream and downstream of the codeword correlator are shown diagrammatically in FIG. 12 and in FIG. 13.

Figure 12:
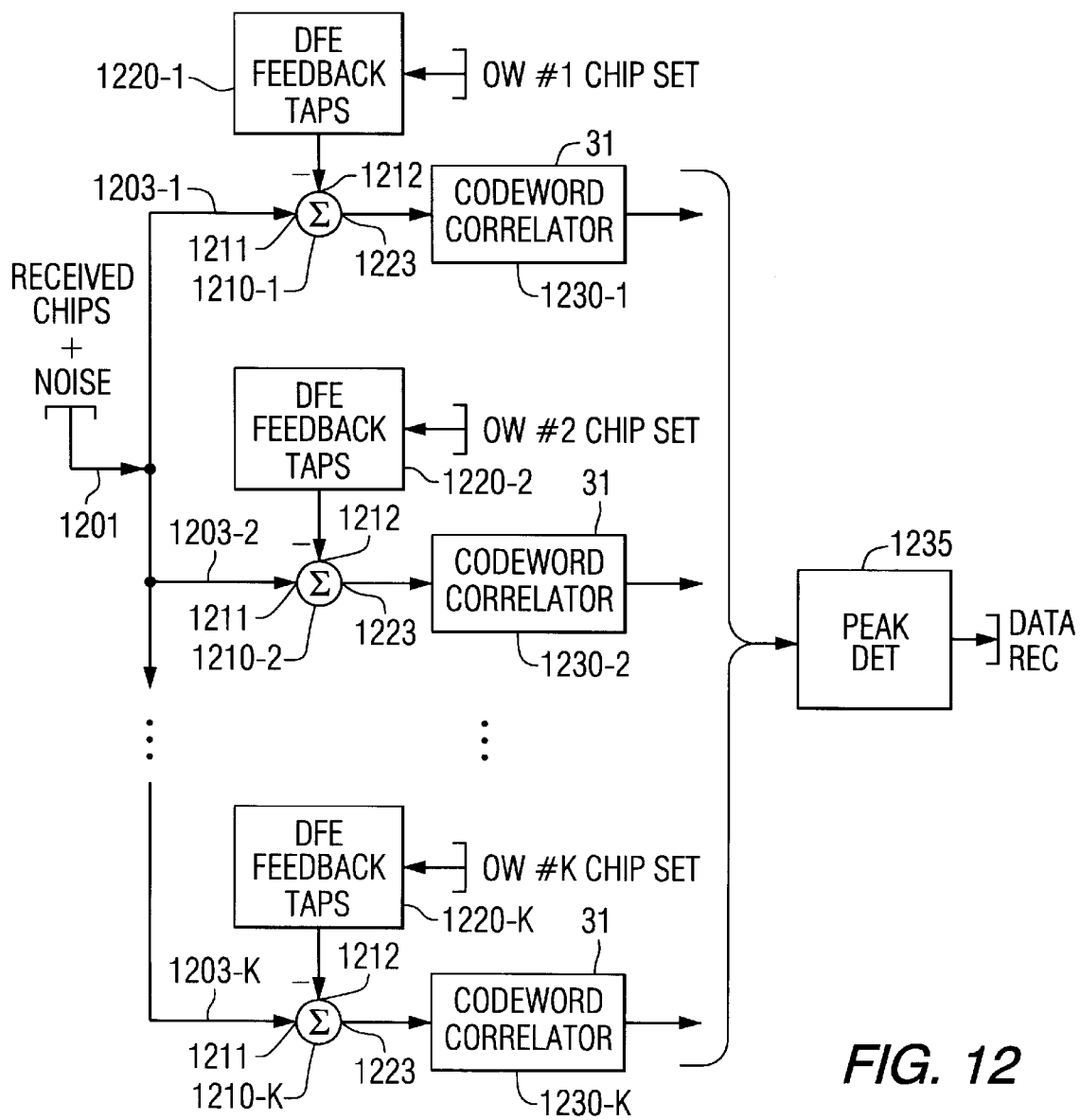
FIG. 12 diagrammatically illustrates a signal processing architecture for removing post cursor multipath distortion upstream of a codeword correlator.

In the upstream implementation of FIG. 12, a received signal path 1201 for the successively received codeword chip sets (plus thermal noise) is shown as being coupled to a plurality K of codeword correlator statistical branches 1203-1, . . . , 1203-K, each of which is associated with a respectively different one of K codeword combinations. As described above, in the present example of using an eight bit field, there are K=256 codeword combinations (comprised of $2^6$=64 codewords, each at one of $2^2$=4 possible quadrature phases (0°, 90°, 180°, 270°)).

Each codeword correlator branch includes a differential combiner 1210, to a first (+) input 1211 of which the received signal path is coupled, and a second (−) input 1212 of which is coupled to receive the output of a respective FIR filter feedback tap set 1220. As each received codeword chip set is shifted into the codeword correlator, each respective FIR filter feedback tap set 1220 serves to synthesize the multipath channel impulse response for its respective codeword's chip set (e.g., comprised of eight chips per codeword in the present example), so as to produce a representation of the post-cursor multipath echo for that codeword chip set.

The weighting coefficients of each codeword's feedback tap set 1220 may be established during a training interval as described above. By subtracting this synthesized post-cursor multipath echo from the received codeword, the input to an associated branch codeword correlator 1230, which is coupled to the output 1223 of the differential combiner 1220, is effectively a 'cleaned-up' version of the received codeword chip set from which multipath-based chip smearing has been removed. As described above, the output of each codeword correlator 1230 of the correlator statistical branches 1203-1, . . . , 1203-K is coupled to a peak detector 1235, which selects the largest output as the transmitted codeword.

Rather than configure the codeword correlator of K branches each of which is associated with a respective chip set as well as its quadriphase component, the codeword correlator architecture of FIG. 12 may be comprised of N (64, in the present example) branches, with the peak detector 1235 configured to conduct a two-stage selection process—the first being the largest magnitude-squared real component to identify the codeword, and the second being the complex value to identify the quadriphase rotation of the codeword.

In the codeword correlator implementation shown in FIG. 12, wherein a differential combiner is placed at the upstream end of each correlation branch, it is unnecessary to repeatedly generate a respective FIR filter feedback tap set as each received codeword chip set is processed. A more computationally efficient scheme for synthesizing the multipath channel impulse response may be realized by differentially combining the contents of the received signal path with the respective FIR feedback filter tap stages downstream of each codeword correlator, as shown in FIG. 13.

Figure 13:
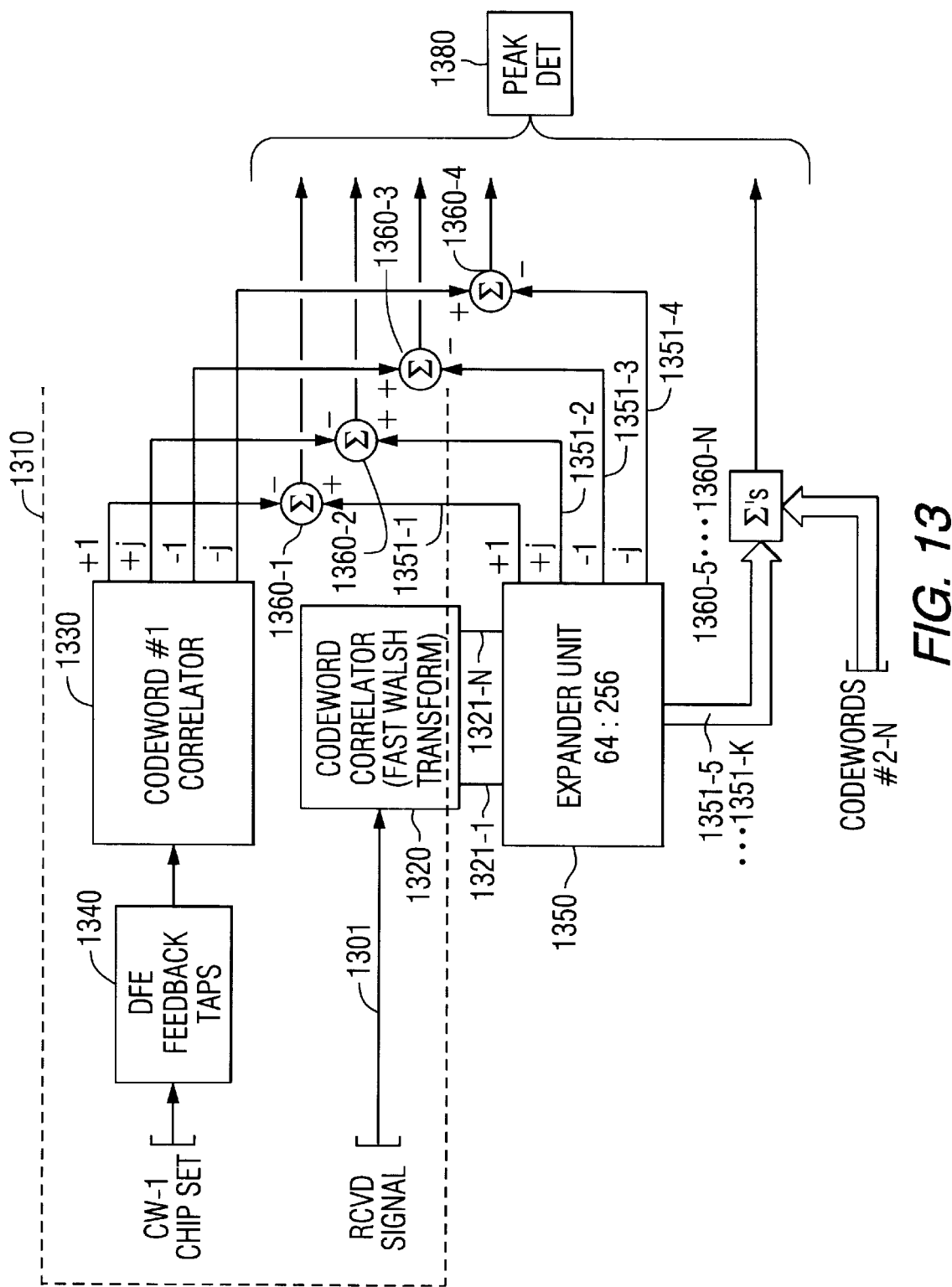
FIG. 13 diagrammatically illustrates a signal processing architecture for removing post cursor multipath distortion downstream of a codeword correlator.

In the downstream implementation shown in FIG. 13, the differential combiner 1310 of a respective statistical branch 1300 is placed at the downstream end of each of a received path codeword correlator 1320, to which the received signal path 1301 is coupled, and a synthesized tap path codeword correlator 1330, to which the output of a respective FIR filter feedback tap set 1340 is coupled.

As in the embodiment of FIG. 12, the correlator architecture contains a plurality K of codeword correlator statistical branches 1300-1, . . . , 1300-K, that are associated with respectively different ones of the K codeword combinations. Within each codeword correlator branch, the codeword correlator 1320 for the received signal path 1301 is preferably implemented as a fast Walsh (Hadamard) structure, which has a set of N outputs 1321-1, . . . , 1321-N, respectively associated with the plurality of N codewords. The synthesized tap path codeword correlator 1330 is coupled to the output of a respective FIR filter feedback tap set 1340, which, as in the embodiment of FIG. 12, is operative to synthesize the multipath channel impulse response for its respective codeword's chip set, so as to produce a representation of the post-cursor multipath echo for that codeword chip set.

In the present embodiment, however, because the differential combining of the processing path for the received signal and the feedback taps is a post-correlation operation, there is no need to regenerate the feedback taps as each newly received codeword chip set is clocked into the correlator. This allows the functionality of the synthesized tap path to be stored in a look-up table, whose weighting coefficients are defined during a codeword training sequence as described above.

To subtract the synthesized post-cursor multipath echo from the received codeword, the N outputs 1321-1, . . . , 1321-N of the received signal path codeword correlator 1320 are expanded by an expander unit 1350 to a plurality of K correlator output lines 1351-1, . . . , 1351-K, respectively associated with the 256 codeword combinations (64 codewords, each at one of 4 possible quadrature phases (0°, 90°, 180°, 270°)). The expander unit 1350 looks at the complex value of each of the N outputs 1321-1, . . . , 1321-N of the received signal path codeword correlator 1320 to identify the quadriphase rotation (+1, +j, −1, −j) of the respective codeword.

As shown by a respective set of four expander output lines 1351-1–1351-4, the quadriphase rotation outputs (+1, +j, −1, −j) of a respective codeword are coupled to first (+) inputs 1361 of a set of differential combiners 1360-1–1360-4. These differential combiners have second inputs 1362 coupled to receive complex correlation values for the synthesized tap path, stored in a look-up table memory. As described above, this obviates having to regenerate the feedback taps as each newly received codeword chip set is clocked into the correlator. The outputs 1363 of the differential combiners 1360-1–1360-K are coupled to a peak detector 1380, which selects the largest real output as the actually transmitted codeword.

As will be appreciated from the foregoing description, the performance of a conventional RAKE receiver used for indoor WLAN multipath applications on direct sequence spread spectrum signals having relatively short codeword lengths can be substantially enhanced by embedding a decision feedback equalizer structure in the signal processing path through the receiver's channel matched filter and codeword correlator. The decision feedback equalizer serves to cancel both inter-codeword interference or 'bleed-over' between codewords, and intra-codeword chip interference (ICI) or smearing of the energy within the chips of a respective codeword.

While we have shown and described several embodiments in accordance with the present invention, it is to be understood that the same is not limited thereto but is susceptible to numerous changes and modifications as known to a person skilled in the art, and WE therefore do not wish to be limited to the details shown and described herein, but intend to cover all such changes and modifications as are obvious to one of ordinary skill in the art.

What is claimed is:

1. A RAKE receiver for a direct sequence spread spectrum receiver employable in a multipath environment comprising:

a channel matched filter to which received codewords of pluralities of direct spreading chips are applied;

a codeword correlator unit coupled in a signal processing path with said channel matched filter, said codeword correlator unit containing a plurality of correlators for detecting respectively different codewords of pluralities of direct spreading chips;

a peak energy detector which is operative to select the largest output from said codeword correlator unit as a respectively transmitted codeword;

a decision feedback equalizer coupled in said signal processing path of said channel matched filter with said codeword correlator unit;

a differential combiner, coupled to an output of said channel matched filter and having an output coupled to said codeword correlator unit, that receives a post-cursor representative echo signal as an estimate of a multipath channel impulse response;

a codeword decision operator, coupled to an output of said codeword correlator unit, operative to generate a decision as to what codeword was transmitted in accordance with the contents of all direct spreading chips in a respective received codeword;

a transmitted codeword synthesizer coupled to receive said decision produced by said codeword decision operator, that synthesizes a replica of the chip contents and phase information of the decided upon transmitted codeword; and a finite impulse response filter, coupled to said transmitted codeword synthesizer, operative to convolve said synthesized replica with an estimate of said channel impulse response and thereby produce said post-cursor representative echo signal.

2. A RAKE receiver for a direct sequence spread spectrum receiver employable in a multipath environment comprising:

a channel matched filter to which received codewords of pluralities of direct spreading chips are applied;

a codeword correlator unit coupled in a signal processing path with said channel matched filter, said codeword correlator unit containing a plurality of correlators for detecting respectively different codewords of pluralities of direct spreading chips;

a peak energy detector which is operative to select the largest output from said codeword correlator unit as a respectively transmitted codeword;

a decision feedback equalizer, coupled in said signal processing path of said channel matched filter with said codeword correlator unit, that is configured to reduce bleeding of energy in a first codeword into that of another codeword; and wherein said channel matched filter is coupled to a differential combiner, which is coupled to receive a post-cursor representative echo signal as an estimate of a multipath channel impulse response, the output of said differential combiner being coupled to said codeword correlator unit, said codeword correlator unit having an output coupled to a codeword decision operator, which is operative to generate a decision as to what codeword was transmitted in accordance with the contents of all direct spreading chips in a respective received codeword, said decision produced by said codeword decision operator being coupled to a transmitted codeword synthesizer, which synthesizes a replica of the chip contents and phase information of the decided upon transmitted codeword, and a finite impulse response filter, which is operative to convolve said synthesized replica with an estimate of said channel impulse response, and thereby produce said post-cursor representative echo signal.

3. A signal processing architecture for a direct sequence spread spectrum receiver employable in a multipath environment comprising:

a cascaded arrangement of a channel matched filter and a codeword correlator to which received codewords containing pluralities of direct spreading chips are applied, and being operative to generate respective impulses associated with multiple transmission paths from a transmitter site for said codewords of pluralities of direct spreading chips;

a peak energy detector which is operative to select the largest impulse output from said cascaded arrangement as a respectively transmitted codeword;

a codeword-based decision feedback equalizer coupled in a signal processing path from said channel matched filter to said codeword correlator;

said channel matched filter being coupled to receive said codewords containing pluralities of direct spreading chips; and a differential combiner, coupled to an output of said channel matched filter and having an output coupled to said codeword correlator, that receives a post-cursor representative echo signal as an estimate of a multipath channel impulse response;

a codeword decision operator, coupled to an output of said codeword correlator, operative to generate a decision as to what codeword was transmitted in accordance with the contents of all direct spreading chips in a respective received codeword;

a transmitted codeword synthesizer coupled to receive said decision produced by said codeword decision operator, that synthesizes a replica of the chip contents and phase information of the decided upon transmitted codeword; and a finite impulse response filter, coupled to said transmitted codeword synthesizer, operative to convolve said synthesized replica with an estimate of said channel impulse response and thereby produce said post-cursor representative echo signal.

* * * * *